US012587255B2

(12) United States Patent
Yuan et al.

(10) Patent No.: US 12,587,255 B2
(45) Date of Patent: Mar. 24, 2026

(54) TIME OFFSET FOR IMPLICIT BEAM SWITCH

(71) Applicant: QUALCOMM Incorporated, San Diego, CA (US)

(72) Inventors: Fang Yuan, Beijing (CN); Yan Zhou, San Diego, CA (US); Tianyang Bai, Mountain View, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 18/551,787

(22) PCT Filed: May 11, 2021

(86) PCT No.: PCT/CN2021/093082
§ 371 (c)(1),
(2) Date: Sep. 21, 2023

(87) PCT Pub. No.: WO2022/236689
PCT Pub. Date: Nov. 17, 2022

(65) Prior Publication Data
US 2024/0187074 A1     Jun. 6, 2024

(51) Int. Cl.
| *H04L 5/12* | (2006.01) |
| *H04B 7/06* | (2006.01) |
| *H04B 7/08* | (2006.01) |

(52) U.S. Cl.
CPC ....... *H04B 7/06952* (2023.05); *H04B 7/0639* (2013.01); *H04B 7/088* (2013.01)

(58) Field of Classification Search
CPC ..... H04B 7/0695; H04B 7/0639; H04B 7/088

USPC ............... 375/262, 260, 259, 219, 295, 316
See application file for complete search history.

(56) References Cited

U.S. PATENT DOCUMENTS

| 2019/0081687 A1 | 3/2019 | Sadiq et al. | |
| 2020/0389221 A1 | 12/2020 | He et al. | |
| 2020/0389886 A1 * | 12/2020 | Lee ....................... | H04W 72/23 |
| 2023/0421273 A1 * | 12/2023 | Fan ....................... | H04W 24/08 |
| 2025/0158695 A1 * | 5/2025 | Oteri ..................... | H04B 7/088 |

FOREIGN PATENT DOCUMENTS

| CN | 111757453 A | 10/2020 |
| WO | WO-2020014857 A1 | 1/2020 |

OTHER PUBLICATIONS

International Search Report and Written Opinion—PCT/CN2021/093082—ISA/EPO—Feb. 10, 2022.
ZTE: "Discussion on the Physical Control Procedure for NTN", 3GPP TSG RAN WG1 #98, R1-1910363, Chongqing, China, Oct. 14-20, 2019, the whole Document, pp. 1-6.

* cited by examiner

*Primary Examiner* — Zewdu A Kassa
(74) *Attorney, Agent, or Firm* — QUALCOMM Incorporated

(57) ABSTRACT

Various aspects of the present disclosure generally relate to wireless communication. In some aspects, a user equipment (UE) may transmit, to a base station, a beam report that indicates that the UE is to switch to a beam for a physical uplink channel. The UE may switch to the beam a specified time offset after one of: transmitting the beam report to the base station, receiving a beam switch response from the base station in response to the beam report, or a scheduled communication on the physical uplink channel. Numerous other aspects are described.

35 Claims, 7 Drawing Sheets

300 ⟶

305
Determine to switch to beam based at least in part on beam measurements

310
Beam report indicating switch to beam

315
Beam switch response

325
Switch to beam after time offset

330
Reference signal

Base station 110

UE 120

Time offset 320 or

300

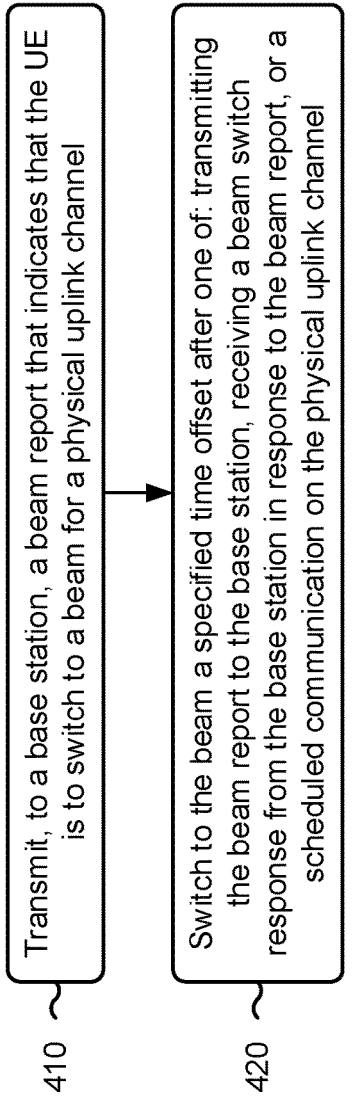

400

410 — Transmit, to a base station, a beam report that indicates that the UE is to switch to a beam for a physical uplink channel 420 — Switch to the beam a specified time offset after one of: transmitting the beam report to the base station, receiving a beam switch response from the base station in response to the beam report, or a scheduled communication on the physical uplink channel

FIG. 4

510 — Receive a beam report that indicates that the UE is to switch to a beam for a physical uplink channel 520 — Switch a beam configuration, based at least in part on the beam report, a specified time offset after one of: receiving the beam report, transmitting a beam switch response in response to the beam report, or a scheduled communication on the physical uplink channel

500

1

TIME OFFSET FOR IMPLICIT BEAM SWITCH

CROSS-REFERENCE TO RELATED APPLICATION

This Patent Application is a 371 national stage of PCT Application No. PCT/CN2021/093082, filed on May 11, 2021, entitled "TIME OFFSET FOR IMPLICIT BEAM SWITCH," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for using a time offset for an implicit beam switch.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting, to a base station, a beam report that indicates that the UE is to switch to a beam for a physical uplink channel, and switching to the beam a specified time offset after one of: transmitting the beam report to the base station, receiving a beam switch response from the base station in response to the beam report, or a scheduled communication on the physical uplink channel.

In some aspects, a method of wireless communication performed by a base station includes receiving, from a UE, a beam report that indicates that the UE is to switch to a beam for a physical uplink channel, and switching a beam configuration, based at least in part on the beam report, a specified time offset after one of: receiving the beam report, transmitting a beam switch response in response to the beam report, or a scheduled communication on the physical uplink channel.

In some aspects, a UE for wireless communication includes a memory and one or more processors coupled to the memory and configured to transmit, to a base station, a beam report that indicates that the UE is to switch to a beam for a physical uplink channel, and switch to the beam a specified time offset after one of: transmitting the beam report to the base station, receiving a beam switch response from the base station in response to the beam report, or a scheduled communication on the physical uplink channel.

In some aspects, a base station for wireless communication includes a memory and one or more processors coupled to the memory and configured to receive, from a UE, a beam report that indicates that the UE is to switch to a beam for a physical uplink channel, and switch a beam configuration, based at least in part on the beam report, a specified time offset after one of: receiving the beam report, transmitting a beam switch response in response to the beam report, or a scheduled communication on the physical uplink channel.

In some aspects, a non-transitory computer-readable medium storing a set of instructions for wireless communication includes one or more instructions that, when executed by one or more processors of a UE, cause the UE to transmit, to a base station, a beam report that indicates that the UE is to switch to a beam for a physical uplink channel, and switch to the beam a specified time offset after one of: transmitting the beam report to the base station, receiving a beam switch response from the base station in response to the beam report, or a scheduled communication on the physical uplink channel.

In some aspects, a non-transitory computer-readable medium storing a set of instructions for wireless communication includes one or more instructions that, when executed by one or more processors of a base station, cause the base station to receive, from a UE, a beam report that indicates that the UE is to switch to a beam for a physical uplink channel, and switch a beam configuration, based at least in part on the beam report, a specified time offset after one of: receiving the beam report, transmitting a beam switch response in response to the beam report, or a scheduled communication on the physical uplink channel.

In some aspects, an apparatus for wireless communication includes means for transmitting, to a base station, a beam report that indicates that the apparatus is to switch to a beam for a physical uplink channel, and means for switching to the beam a specified time offset after one of: transmitting the beam report to the base station, receiving a beam switch response from the base station in response to the beam report, or a scheduled communication on the physical uplink channel.

In some aspects, an apparatus for wireless communication includes means for receiving, from a UE, a beam report that indicates that the UE is to switch to a beam for a physical uplink channel, and means for switching a beam configuration, based at least in part on the beam report, a specified time offset after one of: receiving the beam report, transmitting a beam switch response in response to the beam report, or a scheduled communication on the physical uplink channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
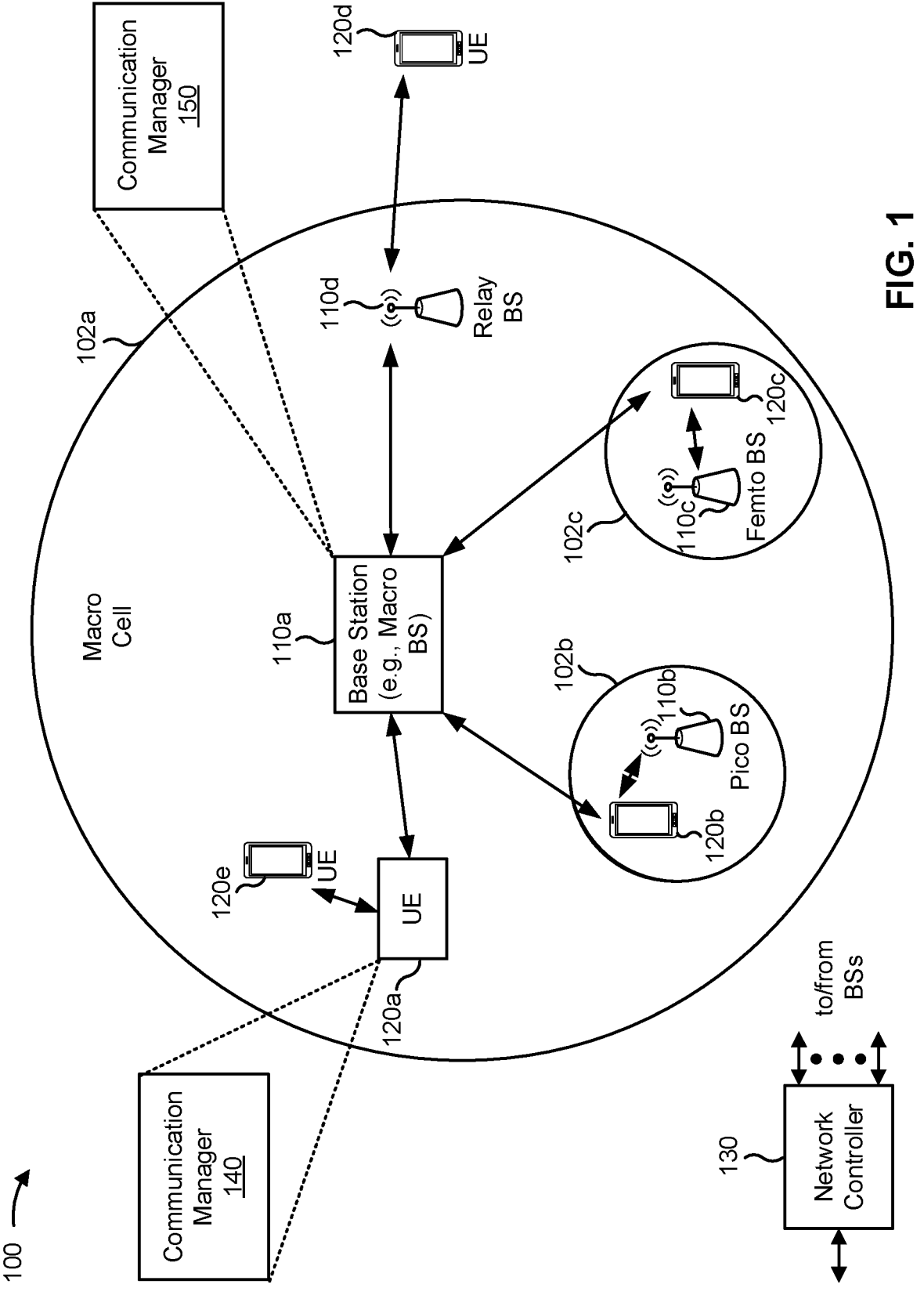
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as NB-IOT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may transmit, to a base station, a beam report that indicates that the UE is to switch to a beam for a physical uplink channel, and switch to the beam a specified time offset after one of: transmitting the beam report to the base station, receiving a beam switch response from the base station in response to the beam report, or a scheduled communication on the physical uplink channel. Additionally, or alternatively, the communication manager 140 may perform one or more other operations described herein.

In some aspects, the base station 110 may include a communication manager 150. As described in more detail elsewhere herein, the communication manager 150 may receive, from a UE, a beam report that indicates that the UE is to switch to a beam for a physical uplink channel, and switch a beam configuration, based at least in part on the beam report, a specified time offset after one of: receiving the beam report, transmitting a beam switch response in response to the beam report, or a scheduled communication on the physical uplink channel. Additionally, or alternatively, the communication manager 150 may perform one or more other operations described herein.

As indicated above, FIG. 1 is provided as an example. Other examples may differ from what is described with regard to FIG. 1.

Figure 2:
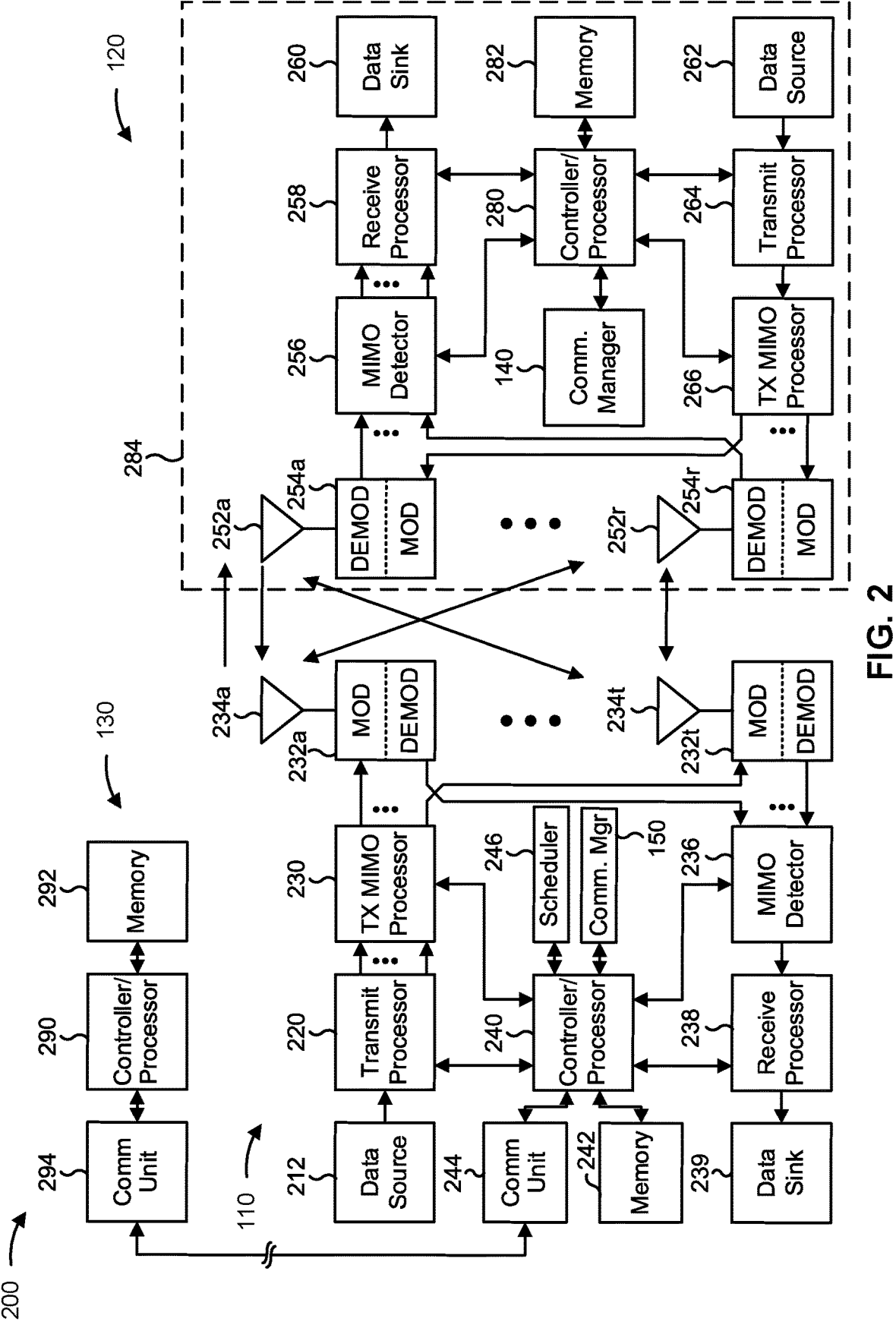
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-7).

Controller/processor 240 of base station 110, controller/processor 280 of UE 120, and/or any other component(s) of FIG. 2 may perform one or more techniques associated with using a time offset for an implicit beam switch, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, the UE 120 includes means for transmitting, to a base station, a beam report that indicates that the UE 120 is to switch to a beam for a physical uplink channel, and/or means for switching to the beam a specified time offset after one of: transmitting the beam report to the base station, receiving a beam switch response from the base station in response to the beam report, or a scheduled communication on the physical uplink channel. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station 110 includes means for receiving, from a UE, a beam report that indicates that the UE is to switch to a beam for a physical uplink channel, and/or means for switching a beam configuration, based at least in part on the beam report, a specified time offset after one of: receiving the beam report, transmitting a beam switch response in response to the beam report, or a scheduled communication on the physical uplink channel. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may transmit or receive communications using a beam. The UE may set a direction of the beam using a spatial relation, or a beam configuration of UE antennas. The UE may switch to a beam that is in another direction, in order to better transmit or receive communications. The beam may have a better signal strength than a current beam. The UE may perform an implicit beam switch. An implicit beam switch is a beam switch initiated by the UE and not by an explicit instruction from a base station (e.g., gNB). The UE may initiate the implicit beam switch based on beam measurements.

When the UE is to switch to the beam, as part of the implicit beam switch, the UE may transmit a beam report, to the base station, that indicates the switch to the beam. The base station may switch to the beam based on the beam report. However, it is not clear, between the UE and the base station, when the implicit beam switch will be applied by the UE and when the implicit beam switch will be applied by the base station. An application time for the implicit beam switch may vary based on a capability of the UE for switching, a beam configuration at the UE, and/or traffic conditions. For example, one UE may have a slower capability than another UE for retuning an antenna array to change beam direction. Also, the beam report may be included in uplink control information (UCI) that does not reach the base station and is not rescheduled. If the application time of the implicit beam switch at the UE does not align with the application time for the implicit beam switch at the base station, some communications may transmitted or received outside of the intended beam. This may degrade communications and cause the UE and the base station to consume processing resources and signaling resource with retransmissions.

According to various aspects described herein, an implicit beam switch may be applied by the UE after a specified time offset. For example, the UE may determine to switch to a beam based at least in part on beam measurements. The UE may transmit a beam report indicating that an implicit beam switch is to occur. The beam report may indicate the beam with a beam index. The beam report may be a channel state information (CSI) report, and the beam may be reported via a reference signal index, such as a CSI reference signal (CSI-RS) resource index or a synchronization signal block (SSB) resource index. The UE may then apply the implicit beam switch after the time offset. The time offset may start after one of several points in time, including after transmitting the beam report, after receiving a beam switch response from the base station, or after a scheduled communication on a physical uplink shared channel (PUSCH) or a physical uplink control channel (PUCCH). The base station may switch to the beam based at least in part on receiving the beam report and on the time offset configured for the UE. The duration of the time offset and/or the starting time for the time offset may be preconfigured or indicated by the base station.

By applying the implicit beam switch after a specified time offset, the UE and the base station may align beam switch application times such that communications are not transmitted or received outside of an intended beam. As a result of the aligned application times, the UE and the base station conserve processing resources and signaling resources that would otherwise be consumed by retransmissions for degraded communications.

Figure 3:
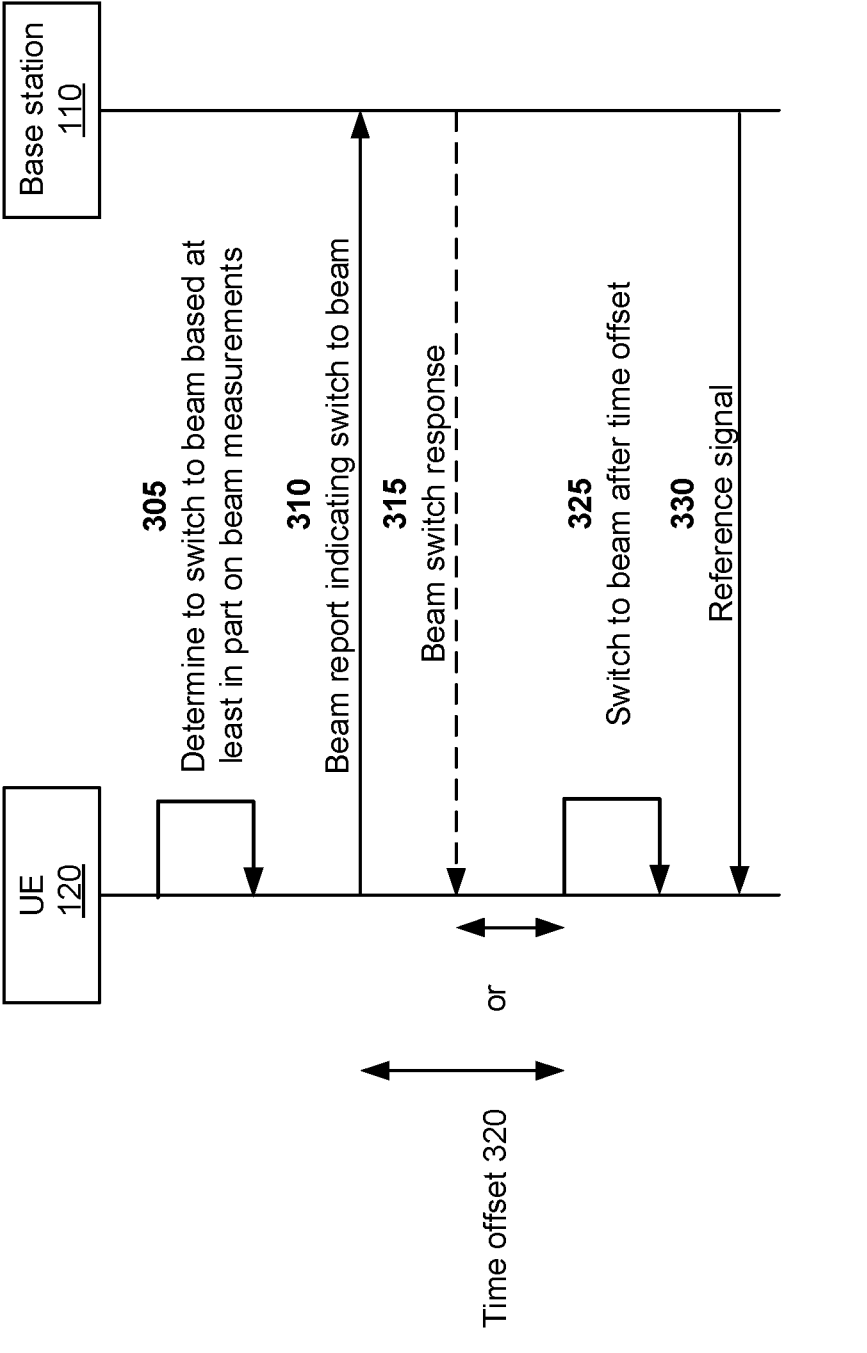
FIG. 3 is a diagram illustrating an example of switching beams after a time offset, in accordance with the present disclosure.

FIG. 3 is a diagram illustrating an example 300 of switching beams after a time offset, in accordance with the present disclosure. As shown in FIG. 3, example 300 includes communication between a base station 110 and a UE 120. In some aspects, the base station 110 and the UE 120 may be included in a wireless network, such as wireless network 100.

As shown by reference number 305, the UE 120 may determine to switch to a beam, as part of an implicit beam switch, based at least in part on beam measurements (e.g., RSRP measurements, RSRQ measurements, signal-to-interference (SIR) measurements). For example, the UE 120 may measure reference signals for one or more beams and determine that the beam has a greater signal strength than a current beam.

As shown by reference number 310, the UE 120 may transmit a beam report to the base station 110. The beam report may indicate that the UE 120 is to implicitly switch to the beam indicated by a beam index which may be carried in the beam report. The beam report may include beam measurements for the beam and/or other beams. The UE 120 may transmit the beam report on a PUSCH or on a PUCCH (although a beam report on the PUCCH may not be allowed for an implicit beam switch in some scenarios). The beam report may be included in a UCI or a medium access control control element (MAC-CE). If the beam report is transmitted in a MAC-CE on a PUSCH, the UE 120 may switch to the beam after the time offset when the UE 120 has a communication scheduled on the PUSCH with the same hybrid automatic repeat request (HARQ) identifier (ID) as the beam report. In some aspects, if the beam report is transmitted in a MAC-CE on a PUSCH, the UE 120 may switch to the beam after the time offset when the UE 120 has a communication scheduled on the PUSCH with the same HARQ ID as the PUSCH communication carrying the beam report and as that of a new data indicator (NDI) that is toggled (e.g., toggled NDI field in the scheduling DCI). If the beam report is transmitted as multiple PUSCH repetitions, the time offset may start from one of: a first symbol of a first repetition of the multiple PUSCH repetitions, a last symbol of the first repetition, a first symbol of a last repetition of the multiple PUSCH repetitions, or a last symbol of the last repetition. In some aspects, if the PUSCH repetition is dropped or cancelled due to conflicts, such as downlink reception, the UE 120 may determine the time offset based at least in part on the PUSCH repetitions after the PUSCH repetition is dropped. In some aspects, if the PUSCH repetition is dropped or cancelled due to conflicts, the UE 120 may determine the time offset based at least in part on the PUSCH repetitions before the PUSCH is dropped. In some aspects, the UE 120 may retransmit the beam report based at least in part on receiving a retransmission indication from the base station 110.

As shown by reference number 315, the base station 110 may optionally transmit a beam switch response. The base station 110 may support the UE 120 to monitor for the beam switch response. The base station 110 may transmit the beam switch response in dedicated resources, such as with a dedicated radio network temporary identifier (RNTI), in a dedicated control resource set (CORESET), in a dedicated search space, or in a dedicated downlink control information (DCI) field.

The UE 120 may prepare to switch to the beam after a time offset 320. The time offset 320 may start at one of several points in time. For example, the time offset 320 may start after transmitting the beam report. The time offset 320 may start after receiving the beam switch response. In some aspects, the time offset 320 may start at another point in time, such as after a scheduled communication on the PUSCH.

A duration of the time offset 320 may be preconfigured or indicated by the base station 110. In some aspects, the time offset 320 may be a specified duration (e.g., 1 millisecond). In some aspects, the time offset may be a specified number of symbols or a specified number of slots. The specified number of symbols or slots may be based at least in part on a subcarrier spacing (SCS) used for DCI or an SCS used for PUSCH communications. The DCI may be the one scheduling a PUSCH communication. A larger SCS may result in a smaller symbol or slot duration, and a smaller SCS may result in a larger symbol or slot duration. In some aspects, the UE 120 may select, for reduced latency, a number of symbols based at least in part on a larger SCS between the DCI SCS and the PUSCH SCS. In some aspects, the UE 120 may select, for more processing time, a number of symbols based at least in part on a smaller SCS between the DCI SCS and the PUSCH SCS. As shown by reference number 325, the UE 120 may switch to the beam after the time offset 320.

In some aspects, the UE 120 may cancel the implicit beam switch during the time offset 320. Within the time offset 320, the UE 120 may expect that there will be no rescheduling of a PUSCH communication with a HARQ identifier ID that is the same as the PUSCH communication carrying the beam report. However, if the UCI goes missing, there may be a misalignment of application times of a beam switch. Therefore, if the UE 120 receives a message rescheduling the PUSCH communication with same HARQ ID as the PUSCH communication carrying the beam report, the UE 120 may determine that the UCI carrying the beam report has gone missing. The UE 120 may then cancel the implicit beam switch.

The UE 120 and the base station 110 may communicate on the beam after both the UE 120 and the base station 110 have switched to the beam, based at least in part on the time offset. For example, as shown by reference number 330, the base station 110 may transmit a reference signal on a transmit beam associated with the beam, and the UE 120 may receive the reference signal using the beam as a receive beam. Note that the beam index in the beam report may correspond to the receive beam at the UE 120 or the transmit beam at the base station 110.

In some aspects, the base station 110 may indicate a retransmission of UCI, including a retransmission of UCI that included the beam report. If the UCI is transmitted on the PUSCH, the base station 110 may indicate the retransmission of UCI in the scheduling DCI for a PUSCH communication. The retransmission indication in the DCI may indicate to retransmit only the UCI or to retransmit both the UCI and the payload for the PUSCH communication of the HARQ ID.

By aligning application times for an implicit beam switch, initiated by the UE 120, the UE 120 and the base station 110 may align communications within a specified beam and improve communications.

As indicated above, FIG. 3 is provided as an example. Other examples may differ from what is described with regard to FIG. 3.

FIG. 4 is a diagram illustrating an example process 400 performed, for example, by a UE, in accordance with the present disclosure. Example process 400 is an example where the UE (e.g., UE 120) performs operations associated with using a time offset for an implicit beam switch.

As shown in FIG. 4, in some aspects, process 400 may include transmitting, to a base station, a beam report that indicates that the UE is to switch to a beam for a physical uplink channel (block 410). For example, the UE (e.g., using communication manager 140 and/or transmission component 604 depicted in FIG. 6) may transmit, to a base station, a beam report that indicates that the UE is to switch to a beam for a physical uplink channel, as described above.

As further shown in FIG. 4, in some aspects, process 400 may include switching to the beam a specified time offset after one of: transmitting the beam report to the base station, receiving a beam switch response from the base station in response to the beam report, or a scheduled communication on the physical uplink channel (block 420). For example, the UE (e.g., using communication manager 140 and/or switching component 608 depicted in FIG. 6) may switch to the beam a specified time offset after one of: transmitting the beam report to the base station, receiving a beam switch response from the base station in response to the beam report, or a scheduled communication on the physical uplink channel, as described above.

Process 400 may include additional aspects, such as any single aspect or any combination of aspects described below and/or in connection with one or more other processes described elsewhere herein.

In a first aspect, process 400 includes receiving a reference signal from the base station using the beam.

In a second aspect, alone or in combination with the first aspect, the time offset starts after the beam report is transmitted, and the time offset includes a specified quantity of symbols or slots.

In a third aspect, alone or in combination with one or more of the first and second aspects, the time offset starts after the beam report is transmitted, and the time offset includes a specified time duration.

In a fourth aspect, alone or in combination with one or more of the first through third aspects, the physical uplink channel is a PUSCH.

In a fifth aspect, alone or in combination with one or more of the first through fourth aspects, the beam report is transmitted as multiple PUSCH repetitions, and the time offset starts from one of a first symbol of a first repetition of the multiple PUSCH repetitions, a last symbol of the first repetition, a first symbol of a last repetition of the multiple PUSCH repetitions, or a last symbol of the last repetition.

In a sixth aspect, alone or in combination with one or more of the first through fifth aspects, the physical uplink channel is a PUCCH.

In a seventh aspect, alone or in combination with one or more of the first through sixth aspects, process 400 includes retransmitting the beam report based at least in part on receiving a retransmission indication from the base station.

In an eighth aspect, alone or in combination with one or more of the first through seventh aspects, process 400 includes receiving the beam switch response, where the time offset starts after the beam switch response is received.

In a ninth aspect, alone or in combination with one or more of the first through eighth aspects, the time offset includes a specified quantity of symbols or slots.

In a tenth aspect, alone or in combination with one or more of the first through ninth aspects, the time offset includes a specified time duration.

In an eleventh aspect, alone or in combination with one or more of the first through tenth aspects, the beam switch response is received in dedicated resources.

In a twelfth aspect, alone or in combination with one or more of the first through eleventh aspects, the beam report is transmitted in UCI.

In a thirteenth aspect, alone or in combination with one or more of the first through twelfth aspects, process 400 includes canceling the switching if the UE receives a rescheduling of the physical uplink channel with a same HARQ ID as a HARQ ID associated with the beam report.

In a fourteenth aspect, alone or in combination with one or more of the first through thirteenth aspects, the beam report is transmitted in a MAC-CE, and the time offset starts after a scheduled communication on the physical uplink channel if the scheduled communication is associated with a same HARQ ID as a HARQ ID associated with the beam report.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
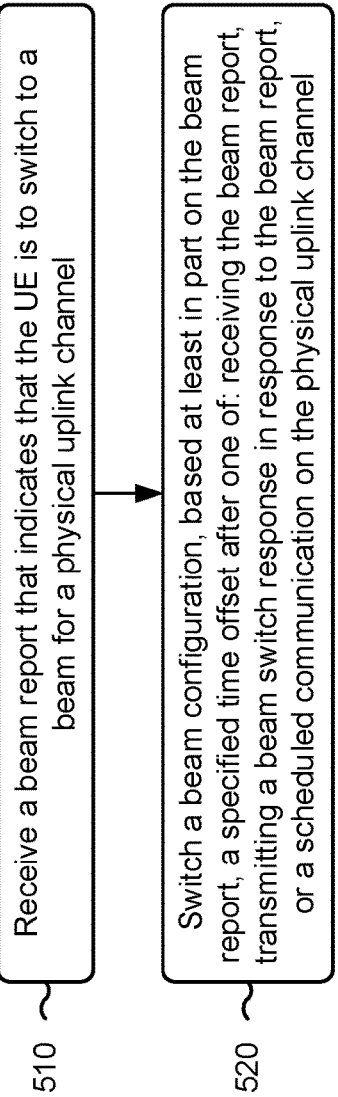
FIG. 5 is a diagram illustrating an example process performed, for example, by a base station, in accordance with the present disclosure.

FIG. 5 is a diagram illustrating an example process 500 performed, for example, by a base station, in accordance with the present disclosure. Example process 500 is an example where the base station (e.g., base station 110) performs operations associated with an application time for an implicit beam switch.

As shown in FIG. 5, in some aspects, process 500 may include receiving, from a UE, a beam report that indicates that the UE is to switch to a beam for a physical uplink channel (block 510). For example, the base station (e.g., using communication manager 150 and/or reception component 702 depicted in FIG. 7) may receive, from a UE, a beam report that indicates that the UE is to switch to a beam for a physical uplink channel, as described above.

As further shown in FIG. 5, in some aspects, process 500 may include switching a beam configuration, based at least in part on the beam report, a specified time offset after one of: receiving the beam report, transmitting a beam switch response in response to the beam report, or a scheduled communication on the physical uplink channel (block 520). For example, the base station (e.g., using communication manager 150 and/or switching component 708 depicted in FIG. 7) may switch a beam configuration, based at least in part on the beam report, a specified time offset after one of: receiving the beam report, transmitting a beam switch response in response to the beam report, or a scheduled communication on the physical uplink channel, as described above.

Process 500 may include additional aspects, such as any single aspect or any combination of aspects described below and/or in connection with one or more other processes described elsewhere herein.

In a first aspect, process 500 includes transmitting a reference signal to the UE using the beam configuration.

In a second aspect, alone or in combination with the first aspect, the time offset includes a specified quantity of symbols or slots.

In a third aspect, alone or in combination with one or more of the first and second aspects, the time offset includes a specified time duration.

In a fourth aspect, alone or in combination with one or more of the first through third aspects, the physical uplink channel is a PUSCH.

In a fifth aspect, alone or in combination with one or more of the first through fourth aspects, the beam report is received as multiple PUSCH repetitions, and the time offset starts from one of a first symbol of a first repetition of the multiple PUSCH repetitions, a last symbol of the first repetition, a first symbol of a last repetition of the multiple PUSCH repetitions, or a last symbol of the last repetition.

In a sixth aspect, alone or in combination with one or more of the first through fifth aspects, the physical uplink channel is a PUCCH.

In a seventh aspect, alone or in combination with one or more of the first through sixth aspects, process 500 includes transmitting a retransmission indication for the beam report.

In an eighth aspect, alone or in combination with one or more of the first through seventh aspects, process 500 includes transmitting the beam switch response.

In a ninth aspect, alone or in combination with one or more of the first through eighth aspects, the beam switch response is transmitted in dedicated resources.

In a tenth aspect, alone or in combination with one or more of the first through ninth aspects, the beam report is received in UCI.

In an eleventh aspect, alone or in combination with one or more of the first through tenth aspects, process 500 includes canceling the switching after transmitting a rescheduling of the physical uplink channel with a same HARQ ID as a HARQ ID associated with the beam report.

In a twelfth aspect, alone or in combination with one or more of the first through eleventh aspects, the beam report is received in a MAC-CE, and the time offset starts after a scheduled communication on the physical uplink channel if the scheduled communication is associated with a same HARQ ID as a HARQ ID associated with the beam report.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
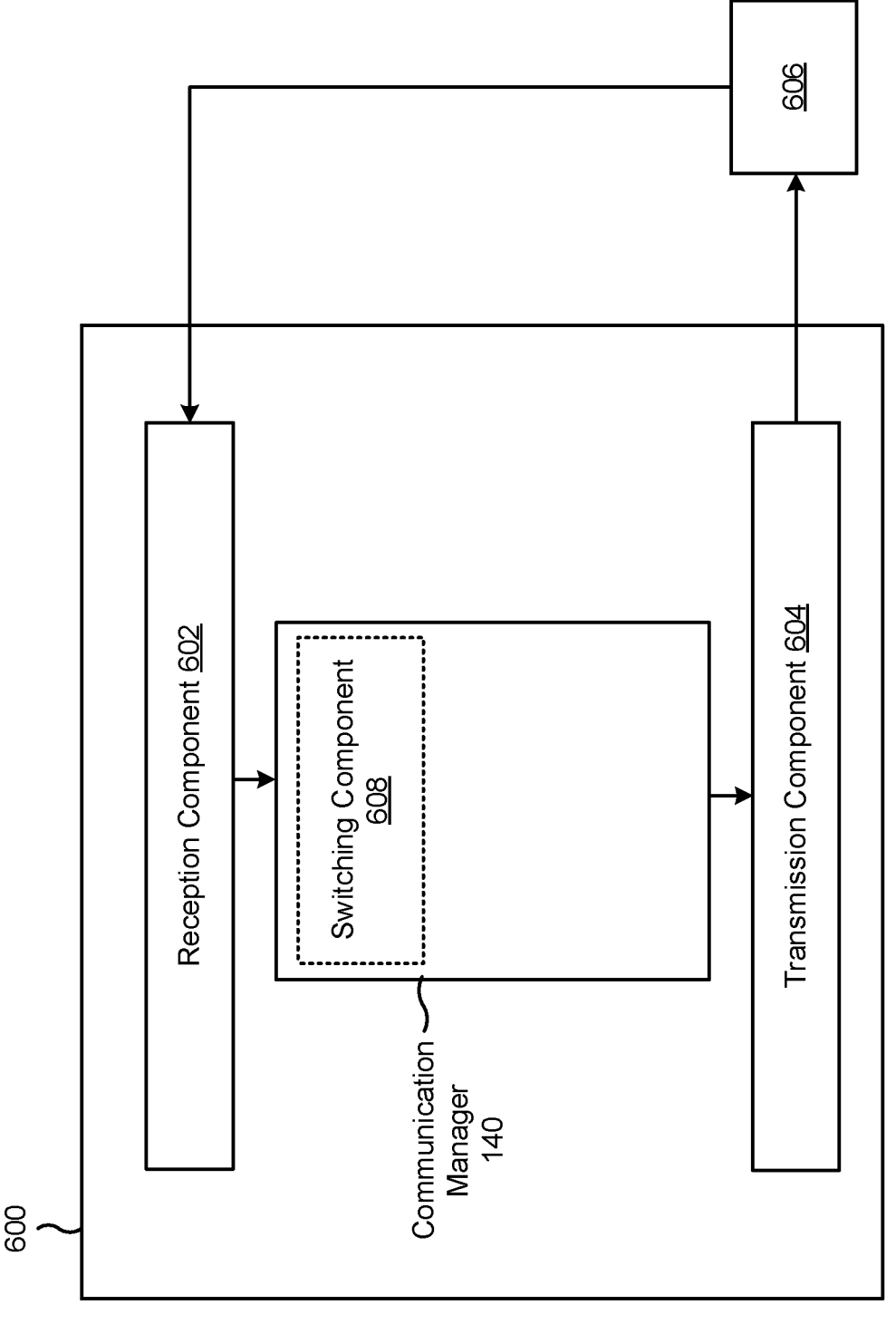
FIGS. 6-7 are block diagrams of example apparatuses for wireless communication, in accordance with the present disclosure.

FIG. 6 is a block diagram of an example apparatus 600 for wireless communication. The apparatus 600 may be a UE (e.g., UE 120), or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include a switching component 608, among other examples.

In some aspects, the apparatus 600 may be configured to perform one or more operations described herein in connection with FIGS. 1-3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The transmission component 604 may transmit, to a base station, a beam report that indicates that the UE is to switch to a beam for a physical uplink channel. The switching component 608 may switch to the beam a specified time offset after one of: transmitting the beam report to the base station, receiving a beam switch response from the base station in response to the beam report, or a scheduled communication on the physical uplink channel. The reception component 602 may receive a reference signal from the base station using the beam.

The transmission component 604 may retransmit the beam report based at least in part on receiving a retransmission indication from the base station. The reception component 602 may receive the beam switch response, where the time offset starts after the beam switch response is received.

The switching component 608 may cancel the switching if the UE receives a rescheduling of the physical uplink channel with a same HARQ ID as a HARQ ID associated with the beam report.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
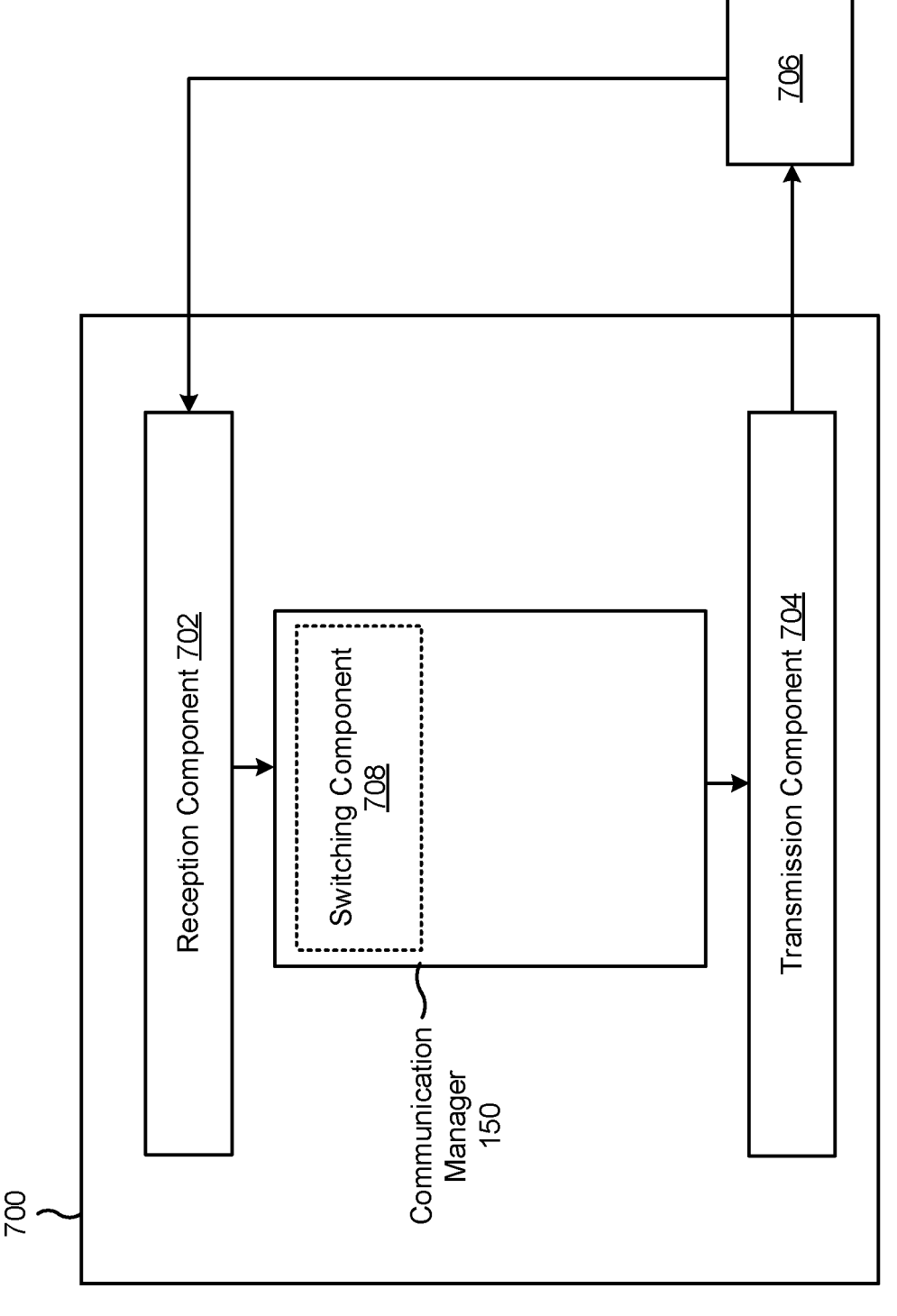

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 150. The communication manager 150 may include a switching component 708, among other examples.

In some aspects, the apparatus 700 may be configured to perform one or more operations described herein in connection with FIGS. 1-3. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The reception component 702 may receive, from a UE, a beam report that indicates that the UE is to switch to a beam for a physical uplink channel. The switching component 708 may switch a beam configuration, based at least in part on the beam report, a specified time offset after one of: receiving the beam report, transmitting a beam switch response in response to the beam report, or a scheduled communication on the physical uplink channel. The transmission component 704 may transmit a reference signal to the UE using the beam configuration.

The transmission component 704 may transmit a retransmission indication for the beam report. The transmission component 704 may transmit the beam switch response.

The switching component 708 may cancel the switching after transmitting a rescheduling of the physical uplink channel with a same HARQ ID as a HARQ ID associated with the beam report.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: transmitting, to a base station, a beam report that indicates that the UE is to switch to a beam for a physical uplink channel: and switching to the beam a specified time offset after one of: transmitting the beam report to the base station, receiving a beam switch response from the base station in response to the beam report, or a scheduled communication on the physical uplink channel.

Aspect 2: The method of Aspect 1, further comprising receiving a reference signal from the base station using the beam.

Aspect 3: The method of Aspect 1 or 2, wherein the time offset starts after the beam report is transmitted, and wherein the time offset includes a specified quantity of symbols or slots.

Aspect 4: The method of Aspect 1 or 2, wherein the time offset starts after the beam report is transmitted, and wherein the time offset includes a specified time duration.

Aspect 5: The method of any of Aspects 1-4, wherein the physical uplink channel is a physical uplink shared channel (PUSCH).

Aspect 6: The method of Aspect 5, wherein the beam report is transmitted as multiple PUSCH repetitions, and wherein the time offset starts from one of: a first symbol of a first repetition of the multiple PUSCH repetitions, a last symbol of the first repetition, a first symbol of a last repetition of the multiple PUSCH repetitions, or a last symbol of the last repetition.

Aspect 7: The method of any of Aspects 1-4, wherein the physical uplink channel is a physical uplink control channel (PUCCH).

Aspect 8: The method of any of Aspects 1-7, further comprising retransmitting the beam report based at least in part on receiving a retransmission indication from the base station.

Aspect 9: The method of any of Aspects 1-8, further comprising receiving the beam switch response, wherein the time offset starts after the beam switch response is received.

Aspect 10: The method of Aspect 9, wherein the time offset includes a specified quantity of symbols or slots.

Aspect 11: The method of Aspect 9, wherein the time offset includes a specified time duration.

Aspect 12: The method of any of Aspects 9-11, wherein the beam switch response is received in dedicated resources.

Aspect 13: The method of any of Aspects 1-12, wherein the beam report is transmitted in uplink control information.

Aspect 14: The method of any of Aspects 1-13, further comprising canceling the switching if the UE receives a rescheduling of the physical uplink channel with a same hybrid automatic repeat request (HARQ) identifier (ID) as a HARQ ID associated with the beam report.

Aspect 15: The method of any of Aspects 1-12 and 14, wherein the beam report is transmitted in a medium access control element (MAC-CE), and wherein the time offset starts after a scheduled communication on the physical uplink channel if the scheduled communication is associated with a same hybrid automatic repeat request (HARQ) identifier (ID) as a HARQ ID associated with the beam report.

Aspect 16: A method of wireless communication performed by a base station, comprising: receiving, from a user equipment (UE), a beam report that indicates that the UE is to switch to a beam for a physical uplink channel: and switching a beam configuration, based at least in part on the beam report, a specified time offset after one of: receiving the beam report, transmitting a beam switch response in response to the beam report, or a scheduled communication on the physical uplink channel.

Aspect 17: The method of Aspect 16, further comprising transmitting a reference signal to the UE using the beam configuration.

Aspect 18: The method of Aspect 16 or 17, wherein the time offset includes a specified quantity of symbols or slots.

Aspect 19: The method of Aspect 16 or 17, wherein the time offset includes a specified time duration.

Aspect 20: The method of any of Aspects 16-19, wherein the physical uplink channel is a physical uplink shared channel (PUSCH).

Aspect 21: The method of Aspect 20, wherein the beam report is received as multiple PUSCH repetitions, and wherein the time offset starts from one of: a first symbol of a first repetition of the multiple PUSCH repetitions, a last symbol of the first repetition, a first symbol of a last repetition of the multiple PUSCH repetitions, or a last symbol of the last repetition.

Aspect 22: The method of any of Aspects 16-19, wherein the physical uplink channel is a physical uplink control channel (PUCCH).

Aspect 23: The method of any of Aspects 16-22, further comprising transmitting a retransmission indication for the beam report.

Aspect 24: The method of any of Aspects 16-23, further comprising transmitting the beam switch response.

Aspect 25: The method of Aspect 24, wherein the beam switch response is transmitted in dedicated resources.

Aspect 26: The method of any of Aspects 16-25, wherein the beam report is received in uplink control information.

Aspect 27: The method of any of Aspects 16-26, further comprising canceling the switching after transmitting a rescheduling of the physical uplink channel with a same hybrid automatic repeat request (HARQ) identifier (ID) as a HARQ ID associated with the beam report.

Aspect 28: The method of any of Aspects 16-25 and 27, wherein the beam report is received in a medium access control element (MAC-CE), and wherein the time offset starts after a scheduled communication on the physical uplink channel if the scheduled communication is associated with a same hybrid automatic repeat request (HARQ) identifier (ID) as a HARQ ID associated with the beam report.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
transmit, to a base station, a beam report that indicates that the UE is to switch to a beam for a physical uplink channel; and
switch to the beam a time offset after one of: transmitting the beam report to the base station, receiving a beam switch response from the base station in response to the beam report, or a scheduled communication on the physical uplink channel.

2. The UE of claim 1, wherein the one or more processors are further configured to receive a reference signal from the base station using the beam.

3. The UE of claim 1, wherein the time offset starts after the beam report is transmitted, and wherein the time offset includes a specified quantity of symbols or slots.

4. The UE of claim 1, wherein the time offset starts after the beam report is transmitted, and wherein the time offset includes a specified time duration.

5. The UE of claim 1, wherein the physical uplink channel is a physical uplink shared channel (PUSCH).

6. The UE of claim 5, wherein the beam report is transmitted as multiple PUSCH repetitions, and wherein the time offset starts from one of: a first symbol of a first repetition of the multiple PUSCH repetitions, a last symbol of the first repetition, a first symbol of a last repetition of the multiple PUSCH repetitions, or a last symbol of the last repetition.

7. The UE of claim 1, wherein the physical uplink channel is a physical uplink control channel (PUCCH).

8. The UE of claim 1, wherein the one or more processors are further configured to retransmit the beam report based at least in part on receiving a retransmission indication from the base station.

9. The UE of claim 1, wherein the one or more processors are further configured to receive the beam switch response, wherein the time offset starts after the beam switch response is received.

10. The UE of claim 9, wherein the time offset includes a specified quantity of symbols or slots.

11. The UE of claim 9, wherein the time offset includes a specified time duration.

12. The UE of claim 9, wherein the beam switch response is received in dedicated resources.

13. The UE of claim 1, wherein the beam report is transmitted in uplink control information.

14. The UE of claim 1, wherein the one or more processors are further configured to cancel the switching if the UE receives a rescheduling of the physical uplink channel with a same hybrid automatic repeat request (HARQ) identifier (ID) as a HARQ ID associated with the beam report.

15. The UE of claim 1, wherein the beam report is transmitted in a medium access control control element (MAC-CE), and wherein the time offset starts after a scheduled communication on the physical uplink channel if the scheduled communication is associated with a same hybrid automatic repeat request (HARQ) identifier (ID) as a HARQ ID associated with the beam report.

16. A base station for wireless communication, comprising:

a memory; and one or more processors, coupled to the memory, configured to:

receive, from a user equipment (UE), a beam report that indicates that the UE is to switch to a beam for a physical uplink channel; and switch a beam configuration, based at least in part on the beam report, a time offset after one of: receiving the beam report, transmitting a beam switch response in response to the beam report, or a scheduled communication on the physical uplink channel.

17. The base station of claim 16, wherein the one or more processors are further configured to transmit a reference signal to the UE using the beam configuration.

18. The base station of claim 17, wherein the beam report is received as multiple physical uplink shared channel (PUSCH) repetitions, and wherein the time offset starts from one of: a first symbol of a first repetition of the multiple PUSCH repetitions, a last symbol of the first repetition, a first symbol of a last repetition of the multiple PUSCH repetitions, or a last symbol of the last repetition.

19. The base station of claim 16, wherein the one or more processors are further configured to transmit a retransmission indication for the beam report.

20. The base station of claim 16, wherein the one or more processors are further configured to transmit the beam switch response.

21. The base station of claim 16, wherein the one or more processors are further configured to cancel the switching after transmitting a rescheduling of the physical uplink channel with a same hybrid automatic repeat request (HARQ) identifier (ID) as a HARQ ID associated with the beam report.

22. The base station of claim 16, wherein the beam report is received in a medium access control control element (MAC-CE), and wherein the time offset starts after a scheduled communication on the physical uplink channel if the scheduled communication is associated with a same hybrid automatic repeat request (HARQ) identifier (ID) as a HARQ ID associated with the beam report.

23. A method of wireless communication performed by a user equipment (UE), comprising:

transmitting, to a base station, a beam report that indicates that the UE is to switch to a beam for a physical uplink channel; and switching to the beam a time offset after one of: transmitting the beam report to the base station, receiving a beam switch response from the base station in response to the beam report, or a scheduled communication on the physical uplink channel.

24. The method of claim 23, further comprising receiving a reference signal from the base station using the beam.

25. The method of claim 23, wherein the time offset starts after the beam report is transmitted, and wherein the time offset includes a specified quantity of symbols or slots.

26. The method of claim 23, wherein the time offset starts after the beam report is transmitted, and wherein the time offset includes a specified time duration.

27. The method of claim 23, wherein the beam report is transmitted as multiple PUSCH repetitions, and wherein the time offset starts from one of: a first symbol of a first repetition of the multiple PUSCH repetitions, a last symbol of the first repetition, a first symbol of a last repetition of the multiple PUSCH repetitions, or a last symbol of the last repetition.

28. The method of claim 23, further comprising retransmitting the beam report based at least in part on receiving a retransmission indication from the base station.

29. The method of claim 23, further comprising receiving the beam switch response, wherein the time offset starts after the beam switch response is received.

30. The method of claim 23, wherein the beam switch response is received in dedicated resources.

31. The method of claim 23, further comprising canceling the switching if the UE receives a rescheduling of the physical uplink channel with a same hybrid automatic repeat request (HARQ) identifier (ID) as a HARQ ID associated with the beam report.

32. The method of claim 23, wherein the beam report is transmitted in a medium access control control element (MAC-CE), and wherein the time offset starts after a scheduled communication on the physical uplink channel if the scheduled communication is associated with a same hybrid automatic repeat request (HARQ) identifier (ID) as a HARQ ID associated with the beam report.

33. A method of wireless communication performed by a base station, comprising:

receiving, from a user equipment (UE), a beam report that indicates that the UE is to switch to a beam for a physical uplink channel; and switching a beam configuration, based at least in part on the beam report, a time offset after one of: receiving the beam report, transmitting a beam switch response in response to the beam report, or a scheduled communication on the physical uplink channel.

34. The method of claim 33, further comprising canceling the switching after transmitting a rescheduling of the physical uplink channel with a same hybrid automatic repeat request (HARQ) identifier (ID) as a HARQ ID associated with the beam report.

35. The method of claim 33, wherein the beam report is received in a medium access control control element (MAC-CE), and wherein the time offset starts after a scheduled communication on the physical uplink channel if the scheduled communication is associated with a same hybrid automatic repeat request (HARQ) identifier (ID) as a HARQ ID associated with the beam report.

\* \* \* \* \*